United States Patent
Lo et al.

(10) Patent No.: US 8,332,738 B2
(45) Date of Patent: Dec. 11, 2012

(54) METHOD FOR ENFORCING GROUP ORIENTED WORKFLOW REQUIREMENTS FOR MULTI-LAYERED DOCUMENTS

(75) Inventors: Wenphing Lo, Alhambra, CA (US); Paul Weinberg, Los Angeles, CA (US)

(73) Assignee: SAP AG, Walldorf (DE)

( * ) Notice: Subject to any disclaimer, the term of this patent is extended or adjusted under 35 U.S.C. 154(b) by 743 days.

(21) Appl. No.: 11/217,072

(22) Filed: Aug. 31, 2005

(65) Prior Publication Data

US 2007/0067728 A1    Mar. 22, 2007

(51) Int. Cl.
*G06F 17/00* (2006.01)

(52) U.S. Cl. ........ 715/200; 715/227; 715/243; 715/264; 715/273; 715/275; 715/277

(58) Field of Classification Search .................. 715/200, 715/234, 264, 703, 227, 243, 273, 275, 277; 704/2–5, 8
See application file for complete search history.

(56) References Cited

U.S. PATENT DOCUMENTS

| | | | |
|---|---|---|---|
| 5,706,452 A * | 1/1998 | Ivanov | 715/751 |
| 5,727,156 A * | 3/1998 | Herr-Hoyman et al. | 709/219 |
| 6,385,627 B1 * | 5/2002 | Cragun | 715/273 |
| 6,598,046 B1 * | 7/2003 | Goldberg et al. | 707/5 |
| 7,013,289 B2 * | 3/2006 | Horn et al. | 705/26 |
| 7,657,511 B2 * | 2/2010 | Brookler et al. | 715/265 |
| 7,664,737 B2 * | 2/2010 | Brookler et al. | 715/265 |
| 7,689,631 B2 * | 3/2010 | Sullivan et al. | 715/264 |
| 7,912,861 B2 * | 3/2011 | Weinberg et al. | 715/200 |
| 2003/0093465 A1 * | 5/2003 | Banerjee et al. | 709/203 |
| 2003/0135501 A1 * | 7/2003 | Frerebeau et al. | 707/100 |
| 2003/0154071 A1 * | 8/2003 | Shreve | 704/9 |
| 2006/0069596 A1 * | 3/2006 | Hatoun et al. | 705/7 |
| 2006/0200766 A1 * | 9/2006 | Lakritz | 715/536 |
| 2006/0277205 A1 * | 12/2006 | Song et al. | 707/102 |

* cited by examiner

*Primary Examiner* — Chau Nguyen
(74) *Attorney, Agent, or Firm* — Buckley, Maschoff & Talwalkar LLC

(57) ABSTRACT

Methods for enforcing group oriented workflow requirements for multi-layered documents. Embodiments allow results of multi-layered operations to dictate the flow of tasks that occur on a multi-layered document. Flow is directed to roles and may be directed by the data values operated on in addition to multi-layered operation results. The system enables the workflow enabled creation and maintenance of multi-layered documents that minimize repeated data to ensure the highest possible data integrity when targeting a publication at multiple audiences. When a publication is changed and requires maintenance, use of a defined workflow for updating the publication ensures consistency in each publication. Embodiments may comprise performance metrics for monitoring and benchmarking publication processes.

18 Claims, 10 Drawing Sheets

Figure 1

MAIN DATA TABLE

| PRODUCT_ID | NAME_ID | DESCRIPTION_ID | ... | ACCESSORY | WEIGHT |
|---|---|---|---|---|---|
| 220304 | 17 | 334 | ... | | 1.2 |
| 220305 | 22 | 427 | ... | 29;47 | 0.6 |

Figure 2

DATA ATTRIBUTE TABLE

| NAME_ID | AUDIENCE_ID | NAME | ... |
|---|---|---|---|
| 17 | 0 | tennis sweater | ... |
| 17 | 1 | tennis jumper | ... |
| 22 | 0 | tennis ball | ... |
| 29 | 0 | ball bag | ... |
| 47 | 0 | ball basket | ... |

Figure 3

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| ... | ... | ... | |

Figure 4

AUDIENCE TABLE

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

Figure 5

Coarse grained IS NULL and IS NOT NULL Operators versus Field Type

| Operator v. Field Type | Returns TRUE based on field type | | |
|---|---|---|---|
| | Non-Lookup Field | Lookup Field | Multi-Value Lookup |
| IS NOT NULL | Returns TRUE if there is a value in any layer for this field | Returns TRUE if there is a link in any layer for this field | Returns TRUE if there is a link in any layer for this field |
| IS NULL | Returns TRUE if there are no values in any layer for this field | Returns TRUE if there are no links in any layer for this field | Returns TRUE if there are no links in any layer for this field |

Figure 6

Value or link locations with Audience Inheritance

| Case | Current Layer | Primary Inherited | Secondary Inherited |
|---|---|---|---|
| 0 | | | |
| 1 | | | • |
| 2 | | • | |
| 3 | | • | • |
| 4 | • | | |
| 5 | • | | • |
| 6 | • | • | |
| 7 | • | • | • |

A bullet (•) means there is a value in a non-lookup field, or a link in a lookup field, or a link in a multi-value lookup field in the corresponding audience layer.

Figure 7

The Fine Grained Audience Layer Operators versus the location of a value or link.

| Audience Layer Operator versus location of value or link | Location of value for Non-Lookup Field, or link for Lookup Field or link for Multi-Valued Lookup Field as per the cases detailed in Figure 2 | | | | | | | |
|---|---|---|---|---|---|---|---|---|
| | 0 | 1 | 2 | 3 | 4 | 5 | 6 | 7 |
| HAS VALUE | | | | | • | • | • | • |
| IS MISSING VALUE | • | • | • | • | | | | |
| INHERITS PRIMARY | | | • | • | | | | |
| INHERITS SECONDARY | | • | | | | | | |
| INHERITS ANY | | • | • | • | | | | |
| DOES NOT INHERIT | • | | | | • | • | • | • |

A bullet (•) means that the audience operator returns a TRUE test result.

METHOD FOR ENFORCING GROUP ORIENTED WORKFLOW REQUIREMENTS FOR MULTI-LAYERED DOCUMENTS

BACKGROUND OF THE INVENTION

1. Field of the Invention

Embodiments of the invention described herein pertain to the field of computer systems. More particularly, but not by way of limitation, one or more embodiments of the invention enable methods for enforcing group oriented workflow requirements for multi-layered documents.

2. Description of the Related Art

Current internationalization products and packages generally provide language, country and region divisions for localizing data. For example, certain programming languages allow for these types of documents or classes to override one another based on a localization setting in order to target a program at a given locale. Other attempts at providing a document to multiple locales use XML. This provides for extremely complex documents that do not take advantage of locales that are closely related. This causes large amounts of duplicate data to be allocated for a particular document. Maintenance becomes chaotic at best when one data value in one locale is changed without changing the corresponding data value in all other locales. Both of the previously described methodologies are generally used for single documents that are not very complex. In short, the current internationalization products are limited in scalability in the end documents that are produced using these methodologies.

There are no known systems that divide data based on an audience wherein an audience allows for arbitrary divisions of documents based on user defined entities. Current systems for generating internationalized documents also fail to take into account the complexities that cause documents to vary on a publication-by-publication basis. For example, the regional, regulatory, and cultural requirements of the audience are generally beyond the scope of current generation internationalization solutions. When publishing documents for a global audience, data that is an appropriate substitute in one instance of the document may not be an adequate substitute in a different instance. French regulations, for instance, prohibit imagery that shows a hypodermic needle whereas in other countries such images are permissible. The same concept is also applicable to language, cultural, and regional requirements associated with a particular document. Current systems provide mechanisms for publishing documents in multiple languages, but require brute force entry of multi-lingual data in a way that tends require large amounts of duplicate operator entries for similar languages, cultural, regional or regulatory specific embodiments of a document. For example, current systems require a complete set of entries for two languages that may only differ in a small way such as United Kingdom and United States English. Current systems do not allow for inheritance of values based on arbitrary divisions in unlimited dimensions and generally only apply to country, language and region for example.

Current systems fail to scale with the amount of data that comprises large documents targeted at a large number of locales. However, in addition, there are no known internationalization document generation and maintenance systems that tightly integrate with workflow engines. Current systems used for the generation and maintenance of documents targeted at multiple localizations may indirectly integrate with workflow engines at best. For example, when a worker is done with a given operation on a document, the worker may pass the status of the document to the workflow engine. The workflow engine then routes the document to other workers based on a completion of the previous worker's task. Workflow engines configured to handle the workflow related to documents send existing documents to various workers instead of routing documents that are in the process of being created as part of the workflow. Since heretofore documents have been single layered, there has been no possibility for a workflow engine to driven by actions occurring on the layers of a multi-layer document targeted at multiple localizations. Current workflow systems do not provide flexible solutions for document generation with regards to designating tasks to be executed in sequential, concurrent or round robin order and do not allow for a document to be broken down category or by family in order to divide and conquer the work effort. There are no known diagramming tools integrated with current workflow engines that comprise category or family (for example, category and manufacturer divisions of a product database) or other publication specific aides such as layout or publication aware modules. Existing systems are not tightly coupled with a backend data set that relates to the publication of a document such as a catalog and do not provide mechanisms for ensuring only properly formed data gets into the document.

There are no known products that assign publication tasks related to a multi-layered document to groups or roles based on publication workflow rules. For example, there are no known products that integrate with rules comprising multi-layered searching for values at a certain inheritance level or testing for fields having or not having a value at a certain inheritance level within a multi-layered document. In addition, there are no known products that integrate with validations or conditional branching validations that utilized multi-layered document comprising inherited data. There are no known products that comprise the ability to assign status to a family or protect a document specific layer or node in order to aide in document creation and maintenance. For example, there are no known products that allow a hierarchical family built on a plurality of main database table fields to have a status set indicating that layout pivoting or qualified records entry is complete.

For at least the limitations described above there is a need for a method for enforcing group oriented workflow requirements for multi-layered documents

BRIEF SUMMARY OF THE INVENTION

Embodiments of the invention enable methods for enforcing group oriented workflow requirements for multi-layered documents. The system provides methods for pushing or pulling data within the multi-layered data set to a group of workers fulfilling a "role". By using role based tasking, personnel changes based on substitution rules allow for temporary absences, including illness or vacation. A group performs multi-layered operations on the multi-layered data set and the results dictate the flow of tasks that occur on a document. The multi-layered documents created and maintained by the system minimize repeated data using multi-layered inheritance to ensure the highest possible data integrity when targeting a publication at multiple audiences. The word "audience" for the purposes of this specification means a group of document consumers such as people or computers that are associated with a language, country, region, regulation or culture or any other user defined division. Audience specific data in a multi-layered document therefore is data targeted at a specific audience. Sophisticated workflow enabled multi-layered data testing and validation tasks ensures that only properly formed data that meets the publication requirements ends up in the document. For example, multi-layered testing for fields having a value or Null value at a certain inheritance level within a multi-layered document allows for a workflow task to be executed based on the result of the test. Multi-layered validation or conditional branching validation using multi-layered data also allows for workflow branching. Layout and publication multi-layered operations also enable workflow branching. When a publication is changed and requires maintenance, use of a defined workflow for updating the publication ensures consistency in each publication. External events such as deadlines may also that trigger workflow tasks. Embodiments of the invention also comprise performance metrics for monitoring and benchmarking publication processes. This enables repeatability and refinement of the publication process allowing for better estimates to be made in the future. Enforcing group oriented workflow for multi-layered documents also reduces cycle times for publication.

As utilized in the context of this disclosure, "fields" are associated with all records of the main data table, i.e., all records in the main data table comprise the same fields. "Attributes" are quantities that are associated with subsets of the main data table, i.e., specific to a given category which is a field in the main data table. Attributes do not reside in the main data table. Therefore, based on the value of a category field or other any other fields of the main data table, attributes may be associated with a subset of the records of the main data table. An "audience" may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. Audiences can be as complex as required to support the number of targets and number of languages, regions, religions, cultures or any other division conceivable. An audience hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. "Lookup tables" are used in order to place a text object for example in one place in the database and which are referenced by a smaller quantity, i.e., a reference identifier or key into the lookup table. Lookup tables save large amounts of space and provide benefits with regards to data integrity since a change of a value in a lookup table may be made once instead of in a million records for example.

Publication of multi-layered documents may be subdivided into tasks related to data entry, family definition, laying out the document and finally publishing the document to a desired media type. Breaking the publication process down in this manner is for example purposes only and other subdivisions of labor with respect to a multi-layered document are in keeping with the spirit of the invention.

Multi-layered data entry operations comprise data entry and import into particular layers and validating data as it is entered. Initial creation of a multi-audience document also comprises setting up an audience inheritance hierarchy in addition to the entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table or a data attribute table in the case of a lookup value as will be explained below. By adding regional, cultural or regulatory or other subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited.

When publishing a document for multiple audiences in multiple media types it is desirable, although not required, to subdivide the information in a main data table into manageable blocks of information. One or more embodiments of the invention define families of data records that indirectly subdivide a main data table into a subset of data that is generally based on an existing taxonomy in the main data table, for example the "category" field of the data records. A family is a subset of main table product records that are related by one or more common fields and/or attributes having the same value, and that may also have additional fields of family data, such as an image, a logo, a paragraph of descriptive text, bullets of specifications, and so on. In one or more embodiments of the invention, attributes correspond to fields of information that apply only to some rather than all of the main table records as previously explained. For example, voltage may be an attribute that applies to motors but not to gears. Fields are in the main data table, attributes are not. Families are defined outside of the main data table and therefore indirectly subdivide the main data table. Families are stored in a family table and may be hierarchical related. Families enable master data to be efficiently published not only to paper, but also to non-paper media such as the Web in a manner that preserves the presentation and organization seen in printed catalogs, with the added benefit of fast, efficient product search.

Families are not random divisions of the main data table. Families exist only for actual value combinations that occur in the main table product records, dramatically reducing the number of families to precisely those containing records (and certainly no more than the number of main table product records), thereby resulting in a much more compact Family Hierarchy. If the entire set of possible values and value combinations were used when creating families, the Family Hierarchy would be unnecessarily large. Consider a repository with 200 categories, 500 manufacturers, and 10,000 products. If Category were to be partitioned by Manufacturer, the set of possible value combinations would result in 100,000 families (even though the main table contains only 10,000 product records). Most of these families would in fact contain no records, since for a particular category, only a small subset of manufacturers offers products (and conversely, each manufacturer offers just a small number of categories of products).

Quality assurance may be performed by the personnel performing data entry or by another group of workers. Multi-layered testing operations comprise checking layers across the desired publication for Null values and ensuring the data exists for the desired audiences in a visually appealing manner for all desired media types that the document will published. By enforcing validation early on, a quality assurance group can concentrate on other tasks such as ensuring that data exists and that the publication looks good. This eliminates "throw it over the wall" type quality assurance since the system is enforcing rules automatically. Subdividing the publication process into family based tasks also allows for more granular control of the process and allows managers to concentrate on families that are incomplete or need special attention.

During testing or after the testing of the document is complete, laying out the document and fine tuning the layout occurs. Use of WYSIWYG family tables allows for quick adjustment of each family view. This step may comprise multiple sub-tasks that are performed sequentially, concurrently or in a round-robin order with respect to members of a group. Laying out data may involve switching between target audiences to visually determine if the data associated with another audience fits the layout defined for a given audience. This step may also be performed by a group separate from the layout group.

Output to a media type is performed by publishing the families associated with a multi-layered document for a desired audience. Publishing selected families in a given sequence can be used to further specify the generation of the document on a document by document basis. The laying out and publishing processes generate parameters that are fed into desktop publishing programs so that the metadata related to the look and feel of the finished document is stored in an embodiment of the invention as opposed to each desktop publishing program. This allows for independence of platform and media type.

By breaking down the publication process into smaller divisions, parallel concurrent processes may be utilized to limit the length of overall time that is required to publish a multi-layered document. One method of breaking down the process previously described is to subdivide the tasks by family. Each family may be worked on independently by a worker from a group responsible for a particular processing task on a multi-layered document. A family hierarchy for a moderate sized publication such as a product manual may comprise thousands of families of data. During the effort of defining and refining the layouts of the families each family will generally be in a different state of completion. Viewing the status of the layouts of each family may be performed for example by a manager that is presented with a display comprising nodes that represent each family in a color coded format to show the level of completion. Any other method of displaying a status related to a multi-layered document with regards to the completion status is in keeping with the spirit of the invention including but not limited to tree views, list views, table views, email or web page based views. The status of each family node may comprise status values including "untouched", "pivots complete", "properties complete", "qualified records complete", "done" or any other status value that aides in the workflow.

An example workflow for creating a publication targeted at multiple audiences is as follows. First, data is imported into the system. The data may be imported into a particular layer for example. Alternatively, data may be input or updated manually. Once the data has been entered into the system via one of these methods, another audience may be defined and added by inheriting many of the values of a particular audience, but only overriding those values that are specific to the newly added audience. Performing these steps may lead to the workflow engine sending messages to groups or to a log for performance monitoring or later assessment. Inheriting values from another layer allows for cultural, regulatory, religious or any other division of a document to be created by only overriding the necessary data values. After defining the inheritance hierarchy, a publication layout may then be created for a family of data. Once the second audience has data and an audience hierarchy is defined so that the missing or overridden data values may be found from an inherited audience, the data may be validated. This may also occur during the data import or data entry process. For example, when data is entered into a field, a popup may occur stating that a particular value is not allowed. This may be because the combination of the value with another field value or range or any other possible validation rule has failed. Once the data has validated it may be sent to another group that may be involved with testing the document for all audiences to ensure that data values exist for all fields for all families of data that a particular target document is using or for all intended audiences. This may involve testing all fields for a given document to see if they are Null or at least if there are inherited values for all of the data a particular target document is using. The document may fine tuned with respect to layout and then published to a desired media type. The layout process and the publication process may entail sending messages to groups or roles in order to allow other sets of workers with particular skill sets perform desired tasks. For example, a group of workers may be tasked to pivot the families that comprise data in a given document layer to make the layout more appealing or logical. When the publication is updated, possibly due to new or altered data in one or more layers, then the process may repeat from the data entry step, or if only the layout has changed, then from the layout step. If the publication is to be generated for a new media type, then that step may be re-performed as well. During each of these tasks, as the multi-layered operations are occurring, performance metrics may be obtained which may be used by management to determine how long each step occurs, which allows for selection of skill level and worker numbers for a given role. Knowing how long a re-publish will take or how much money it will cost allows for more accurate budgeting and quality control since managers have the data from which to make a business decision.

BRIEF DESCRIPTION OF THE DRAWINGS

The above and other aspects, features and advantages of the invention will be more apparent from the following more particular description thereof, presented in conjunction with the following drawings wherein:

FIG. 1 illustrates a main data table used in conjunction with one or more embodiments of the invention.

FIG. 2 illustrates a data attribute table used in conjunction with one or more embodiments of the invention.

FIG. 3 illustrates an audience order table used in conjunction with one or more embodiments of the invention.

FIG. 4 illustrates an audience table used in conjunction with one or more embodiments of the invention.

FIG. 5 illustrates coarse grained search operators.

FIG. 6 illustrates the value or link locations within the Audience Inheritance.

FIG. 7 illustrates the Fine Grained Audience Layer Operators versus the location of a value or link.

DETAILED DESCRIPTION

Figure 8:
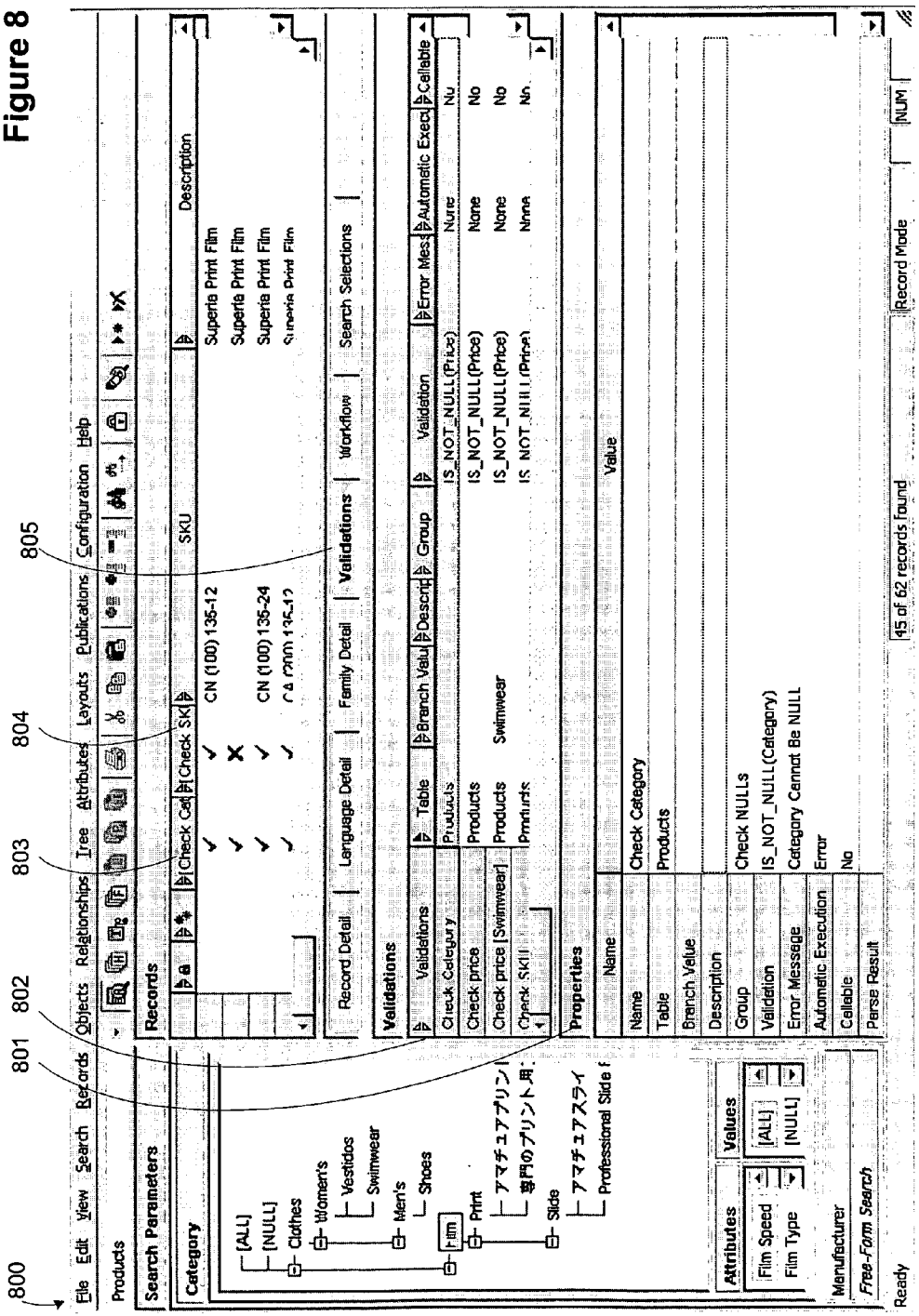
FIG. 8 illustrates an embodiment of an application comprising a validation user interface.

A method for enforcing group oriented workflow requirements for multi-layered documents will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Initial creation of a multi-audience document comprises setting up an audience inheritance hierarchy and entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table in the case of a non-lookup value or a data value may exist in a data attribute table in the case of a lookup value that is indirectly referenced via a link as will be explained below. FIG. 1 shows a main data table comprising products for example. The name of a product in this example is entered into another table namely the data attribute table shown in FIG. 2. For each audience that has a unique value for the given data attribute, an entry in the data attribute table may be created. For example product number 220304 shown in the main data table comprises an audience specific name that is a lookup value that is obtained from the data attribute table when generating a document. Specifically, NAME_ID 17 is obtained from the data attribute table for a desired audience identifier. In this case if the audience identifier is 0 then the name "tennis sweater" is obtained. If the audience identifier is 1 then the name "tennis jumper" is obtained. For example when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name (no NAME_ID 17 and AUDIENCE_ID 1 entry exists in the data attribute table), then the audience order table shown in FIG. 3 is referenced in order to obtain the next audience identifier to use in finding a suitable value via inheritance. Since the next value in the audience order field for audience 1 is 0, then audience 0 is used in looking up the value next in the data attribute table. In this way, only one entry for a given data entry is required since multiple audiences can share the value. In other words, the value "tennis ball" is obtained since the NAME_ID 22 and AUDIENCE_ID 0 is used to obtain this inherited value. In FIG. 1, the ACCESSORY field shows a NULL value for PRODUCT_ID 220304 and a value of "29;47" for PRODUCT_ID 220305. The "29; 47"entry is a multi-value lookup field that specifies two links to the data attribute table. The WEIGHT column shows entries that are local to the main data table and are not obtained via lookup using the data attribute table.

By adding regional, cultural or regulatory subdivisions within the audience hierarchy and inheriting large portions of existing audience specific data entries, a large number of audience specific documents may be generated with a minimal amount of data entry required. In the example shown in FIG. 2, if there a thousand separate entries related to tennis and only a few of the items differ in name between audiences, then the second audience addition comes at very little expenditure of labor in entering the data that differs. For example, audience 1 corresponding to English Australia in the audience table shown in FIG. 4 may be added taking advantage of nearly all of the entries of the English US audience. In addition, setting up a corresponding audience order entry in the audience order table shown in FIG. 3 allows for the traversal of audiences in a hierarchical manner in order to obtain or search for values or the existence of values. For this example, audience 1 specifies that it first utilize its own audience identifier 1 in obtaining or searching for data, followed by audience identifier 0. The semicolon specifies a stop flag that denotes that any data found lower (to the right) in the hierarchy should not be published, but may be shown on the user interface to aid in the publication of a multi-audience document. Any other data layout allowing for traversal of hierarchies is in keeping with the spirit of the invention.

There are at least three types of fields used with embodiments of the invention, non-lookup fields, lookup fields and multi-value lookup fields. Non-lookup fields are traditional fields that have a value in a field such as the WEIGHT field shown in FIG. 1. Lookup fields comprise a link to another table that specifies a value in the second table such as the NAME_ID field shown in FIG. 1. Multi-value lookup fields may comprise more than one link to another table or alternatively may comprise a link identifier to a number of fields in another table such as the ACCESSORY field shown in FIG. 1. Although multi-value lookup fields that comprise more than one link per field are shown herein with semicolons separating the multiple links in a given field. One skilled in the art will readily appreciate that any method of indirectly associating multiple values with one field is in keeping with the spirit of the invention. Although the example tables shown comprise one level of indirection, the data attribute table may comprise a link to a lookup table for lookup values and a text or numerical entry for a non-lookup value thereby removing non-lookup values from the main data table and providing another level of indirection. Any level of indirection is in keeping with the spirit of the invention.

Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. For example, updating the name of a non-lookup value, lookup value or multi-value lookup is automatically available to any audience inheriting values from a given audience. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited. For example as shown in FIG. 2, by adding any value such as was done for name identifier 22, that value is available to all audiences that comprise the audience 0 in their inheritance chain as shown in FIG. 3. The main data table shown in FIG. 1 is not required to be altered for all audiences, instead attributes are added or modified in the main data table or in the data attribute table shown in FIG. 2 and are automatically available to audiences that inherit these values.

Data may also be imported into the system and associated with a particular layer. After importing data, the data may be validated, searched and tested. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers.

Validating, searching and testing multi-layered data occurs with respect to at least one audience identifier or current audience identifier after the audience hierarchy is set up and data has been entered or imported or otherwise exists for a plurality of audiences as per FIGS. 1-4. The audience identifier(s) for searching and testing may be entered manually or automatically from the user or computer associated with a user. The audience identifier may specify the language, or the language and country, or the language, country and region, or the language, region and culture, or the culture and regulatory area or any other combination of audience identifying values. Specifying the current audience identifier or multiple audience identifiers allows for the proper hierarchy to be used in the search as per the inheritance hierarchy defined for each audience as per the audience order shown in FIG. 3.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. One or more embodiments of the invention use multiple inheritance levels separated by a stop flag shown in FIG. 3 as an asterisk separating inheritance levels that are capable of being used for publication versus inheritance levels that are only used for obtaining data for the user interface.

Values may be searched for NULL or non-NULL entries for all layers at once or on a fine grained level. When searching for NULL entries, values or links to values are tested depending on the type of the field. For fields of type non-lookup, values themselves are checked. For fields of type lookup or multi-value lookup, the links themselves are tested. To determine if a value pointed at by a link is null, the sub-table itself may be tested for NULL values that are referenced by a given link. In practice, however, with a multi-audience repository and audience inheritance, the "IS NULL" operator may not always be granular enough, since it does not distinguish between the various cases of missing data such as data missing entirely from all layers, missing from the current layer but inherited from some other layer, and so on. For example, if the current audience identifier is 1, then for a lookup or multi-value lookup field, the audiences with identifiers 1, 0 and 4 are checked as per the second row of the audience order table shown in FIG. 3 in combination with the NAME_ID for a particular name via the data attribute table. For example, if there is any value with a NAME_ID of 17 and an audience identifier of 1, 0 or 4, then a value exists and "IS NOT NULL" returns TRUE. FIG. 5 shows the possible outcomes for searching using the coarse grain operators "IS NULL" and "IS NOT NULL".

FIG. 6 shows value or link location cases for a three level inheritance embodiment. For example, if a value or link exists in a particular layer, a bullet is shown in the respective cell. Again, embodiments of the invention may utilize any level of indirection and the non-lookup values shown in the main data table of FIG. 1 versus the lookup values shown in the data attribute table of FIG. 2 are exemplary and are shown in this manner for ease of illustration. One skilled in the art will readily recognize that non-lookup values may be implemented one level of indirection lower as well as adding a second level of indirection to the lookup and multi-value lookup fields.

To deal with the different cases of data locations with audience inheritance as shown in FIG. 6, the system may utilize audience layer operators that allow for searching for data or the existence of data with fine grained granularity in specified layers at shown in FIG. 7. For non-lookup fields, the audience layer operator used in a search returns TRUE for fields that have a non-null value. For lookup fields, the audience layer operator used in a search returns TRUE for fields that have a link to a given lookup value. For multi-value lookup fields, the audience layer operator used in a search returns TRUE for fields that have at least one link to a given lookup value. In multi-audience data sets, searching for the existence of data using the coarse grained "IS NULL" operator returns non-lookup fields that have all associated audience inheritance levels set to NULL or lookup fields that do not link to a sub-table. The fine grained "HAS VALUE" operator checks for missing data in the current audience layer only as opposed to checking in all layers as the coarse grained "IS NULL" operator does. Other predefined audience layer operators may also be used for fine grain searching such as "HAS VALUE", "IS MISSING VALUE", "INHERITS PRIMARY", "INHERITS SECONDARY", "INHERITS ANY", "DOES NOT INHERIT".

The "HAS VALUE" and "IS MISSING VALUE" operators provide complementary functions used to determine if the current audience layer comprises a value or link or whether the converse is true. This corresponds to the current layer column of FIG. 6. The "INHERITS PRIMARY" operator returns TRUE when the current audience layer inherits a value or link from the primary inheritance layer but not from the secondary inheritance layer or current layer and corresponds to rows 2 and 3 of FIG. 6. The "INHERITS SECONDARY" operator returns TRUE when the current audience layer inherits a value or link from the secondary inheritance layer but not from the primary inheritance layer or current layer and corresponds to row 1 of FIG. 6. The "INHERITS ANY" operator returns TRUE when the current audience layer inherits a value or link from either the primary or secondary audience layer. The "DOES NOT INHERIT" operator returns TRUE when the current audience layer does not inherit a value or link which corresponds to finding the value or link in the current audience or not finding any value at all in which to inherit from and this corresponds to rows 0, 4, 5, 6 and 7 of FIG. 6. Other embodiments of the invention may return the actual value or link for a positive result and a null reference for a negative result.

The result set returned from a coarse grained and/or fine grained operator search may be presented to the user in a variety of ways. For testing multiple layers, a list of search results per audience layer may be presented to the user in list form, or tabular form or in any other method that allows the user to view the results of the search. Any method of visually presenting the results of a search on one or more audience identifiers is in keeping with the spirit of the invention. Depending on the results of the search or the results of any fields found to be Null for example, a workflow message may be sent to a group or a log for further processing or performance monitoring or metrics analysis.

FIG. 8 illustrates an embodiment of an application comprising a validation user interface. The elements in application 800 comprise a validation tab 805 comprising rows of validations 802, each of which extends horizontally showing the name of the validation (e.g., "Check Category", "Check Price", "Check Price [Swimwear]", "Check SKU"), the table(s) associated with the validation, the branch value(s) used for branching the validation, a description of the validation, the validation group(s) that the validation is associated with, the validation expression, an error message to display when the validation fails, an automatic execution value of none, warning or error, a callable flag for determining if the validation is callable from another validation and a parse result read-only success or failure field that shows the results of parsing the validation expression. The properties of a selected validation, in this case the "Check Category"row in rows of validations 802 are shown in validation properties edit area 801. Each row in validation properties edit area 801 corresponds to each column in rows of validations 802. Each row in validation properties edit area 801 is edited by clicking the mouse in the corresponding row and entering information. The result of executing a validation or validation group is shown as a column in the records list, for example "[Check Category]" 803 and "[Check SKU]" 804 showing the status of each validation for example as will be described further below. At least one workflow task may be associated with each validation by right clicking on the validation for example to select a desired action to take based on the result of the multi-layered operation, in this case a validation that may use inherited values.

A validation expression may be performed manually or automatically. When a validation expression is performed with respect to one or more records, the success or failure may be indicated for each record in an interface. A validation expression may be performed automatically for a database update to warn against or prevent the entry of invalid data and ensure data integrity. A validation expression may also be automatically performed from one or more workflows to implement a business process with system-enforced data integrity. The validation metadata may comprise a setting that signifies the level of execution as being warning and error. Executing the validation refers to executing the validation expression. Any method of executing the validation or validation expression is in keeping with the spirit of the invention.

Figure 9:
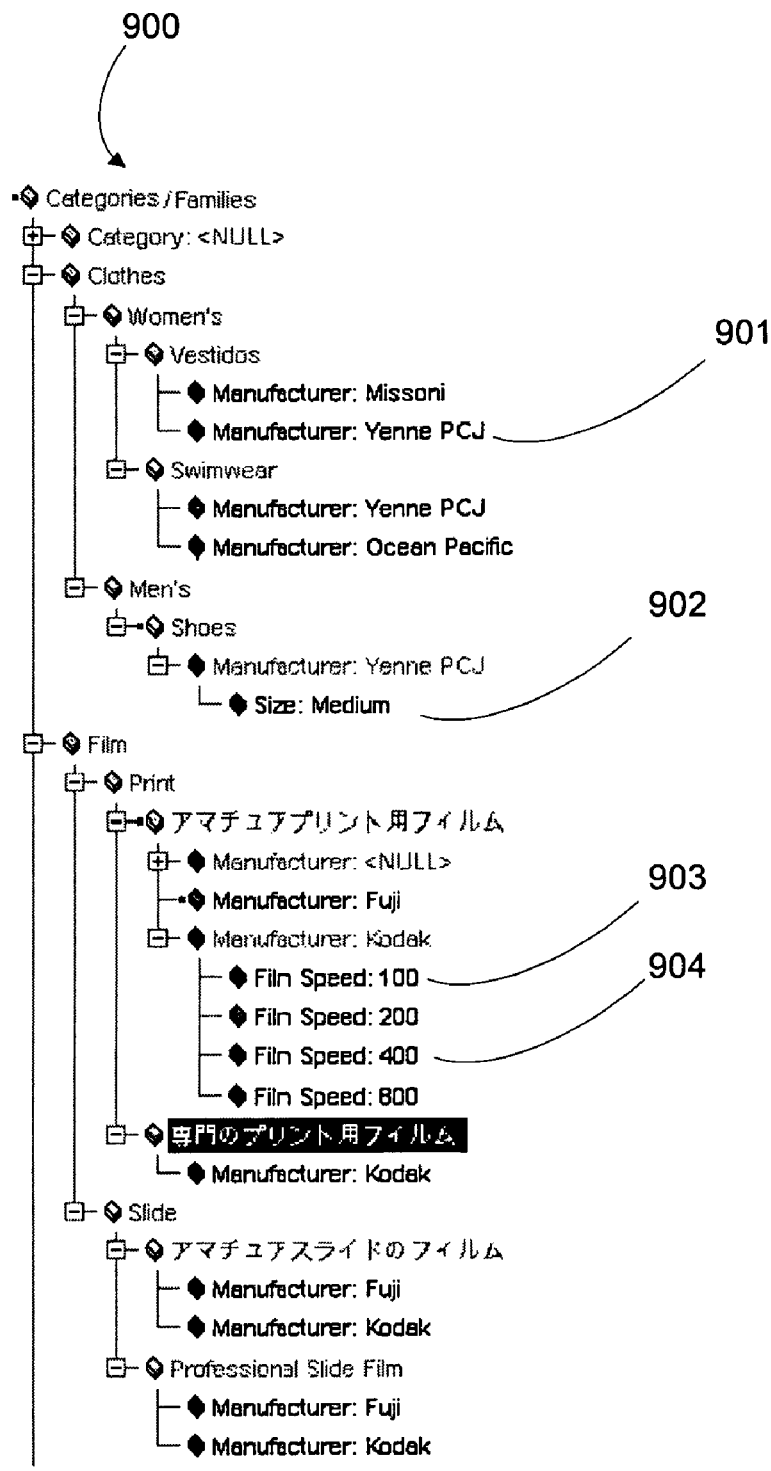
FIG. 9 illustrates a family hierarchy showing workflow status for families associated with a particular multi-layered document.

FIG. 9 illustrates a family hierarchy showing workflow status for families associated with a particular multi-layered document. Family tree 900 displays the families that actually exist in the multi-layered data set. Family 901 is shown in a particular color to indicate that it has failed validation. Family 902 is shown in a different color to indicate that it has failed a test for Null values. Family 903 is shown in a different color to indicate that it has passed the pivoting step. Family 904 is shown in a different color to indicate that it has been successfully reviewed. Other status values are in keeping with the spirit of the invention. Alternatively, icons representing the different status may be displayed to indicate the workflow related status of a family, or a different color in combination with a status icon may be utilized. Any other method of visually displaying a workflow related status with respect to a family of a multi-layered document is in keeping with the spirit of the invention.

Figure 10:
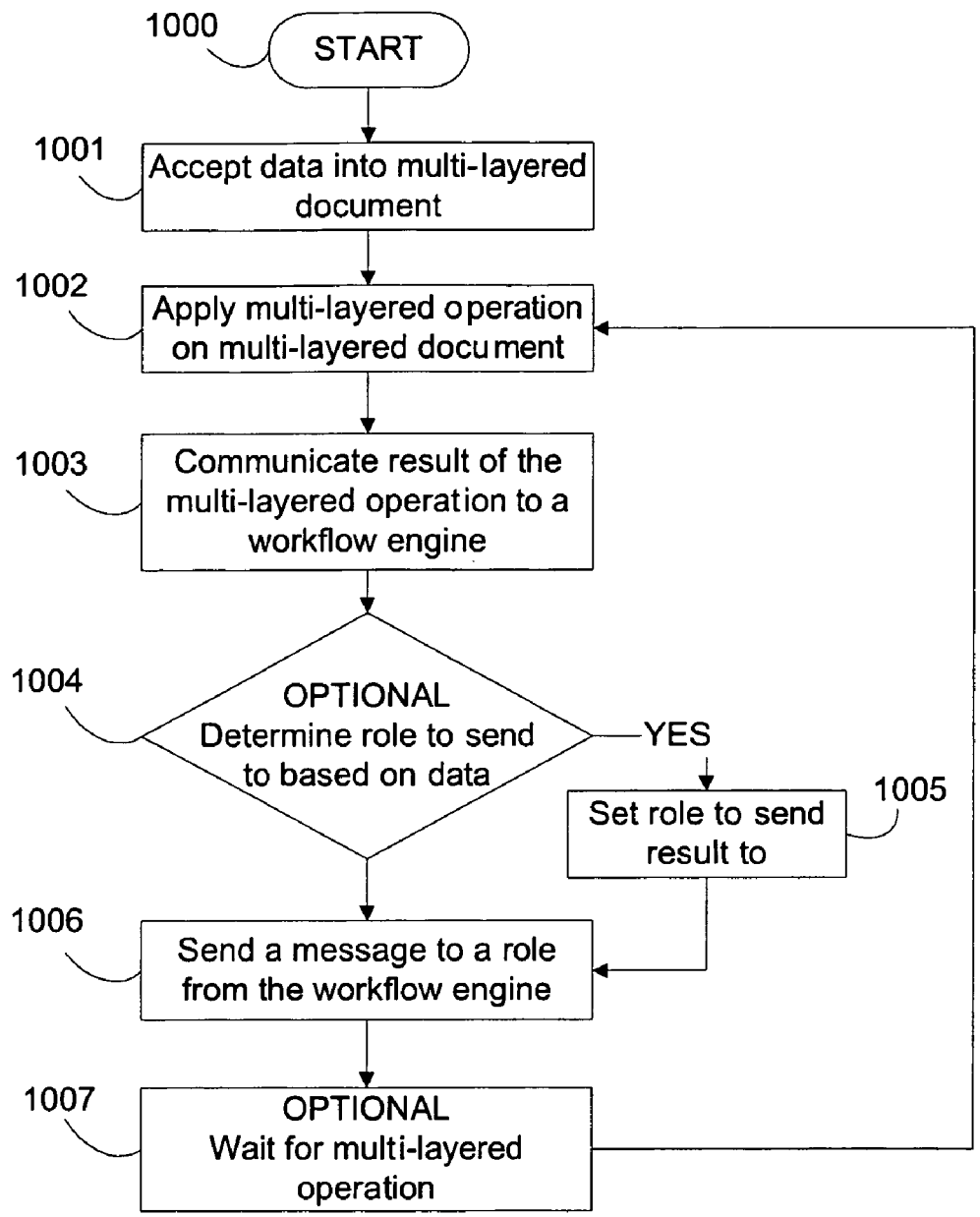
FIG. 10 illustrates an embodiment of a method for enforcing group oriented workflow requirements for multi-layered documents.

FIG. 10 illustrates an embodiment of a method for enforcing group oriented workflow requirements for multi-layered documents. Processing starts at 1000. Data is accepted into the system at 1001. This may involve importing data to a specific layer or entering data manually. A multi-layered operation is performed at 1002 that utilizes data from at least one layer of a multi-layered data set or document. The result of the multi-layered operation is communicated to a workflow engine at 1003. This may involve use of message queuing or other message communication technologies include direct object call. Optionally, a role to send the result to may be determined from the data that is being operated on at 1004. For example, if the data being operated on is specific to a family then a particular operation may cause the result to be sent to a role that is currently operating on the family or the next role in the workflow line that is responsible for the next operation on the multi-layered data set if the task has been completed. If the role to send to is based on the data as determined at 1004, then the role to send to is set at 1005, otherwise, processing continues at 1006. The system may wait for another operation at 1007 or exit. If the system is waiting for further operations, then processing continues when a multi-layered operation occurs, therein continuing processing at 1002.

U.S. Pat. No. 6,754,666 entitled "Efficient Storage And Access In A Database Management System" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 11/142,809, entitled "Multi-Layered Data Model for Generating Audience Specific Documents" filed May 31, 2005, U.S. patent application Ser. No. 11/193,014 entitled "Method For Conditionally Branching A Single Validation" filed Jul. 29, 2005, U.S. patent application Ser. No. 11/217,068 entitled "Method for Searching Layered Data" filed Aug. 31, 2005 are all hereby incorporated herein by reference and used in combination with the embodiments of the invention enabled herein.

While the invention herein disclosed has been described by means of specific embodiments and applications thereof, numerous modifications and variations could be made thereto by those skilled in the art without departing from the scope of the invention set forth in the claims.

What is claimed is:

1. A method for enforcing group oriented workflow requirements for multi-layered documents comprising:

obtaining by a computer system a current audience identifier wherein said current audience identifier is associated with a current audience;

obtaining by said computer system a current audience order defining an order of inheritance for said current audience identifier, wherein said current audience order comprises a first audience identifier associated with a first audience data layer and a second audience identifier associated with a second audience data layer, wherein a current audience data layer consists primarily of attribute values unique to said current audience data layer with respect to said first audience data layer and said second audience data layer;

accessing by said computer system a multi-layered data set comprising a plurality of audience layers by said computer system to import data associated with said current audience, wherein said plurality of audience layers are traversed based upon said current audience order and wherein said imported data comprises a subset of data unique to said current audience and an inherited subset of data comprising data inherited from at least one of said first audience data layer and said second audience data layer;

applying by said computer system a multi-layered operation on said multi-layered data set, wherein said multi-layered operation comprises searching for a value of an attribute in said current audience data layer, searching for said value in said first audience data layer when said current audience data layer does not contain said value for said attribute, and searching for said value in said second audience data layer when said first audience data layer and said current audience data layer do not contain said value for said attribute;

communicating by said computer system a result of said multi-layered operation to a workflow engine;

sending a message via said workflow engine to a role based on said result;

displaying a first portion of the multi-layered data set along with a first visual representation indicating that the first portion was inherited from the first audience data layer; and displaying a second portion of the multi-layered data set along with a second visual representation indicating that the second portion was inherited from the second audience data layer.

2. The method of claim 1, further comprising:
generating said result based on a validation based on a function that uses a first attribute value of a given attribute in said first audience data layer and a second attribute value of said given attribute in said second audience data layer.

3. The method of claim 2, further comprising:
determining said role to send said message to based on a family associated with said first attribute value and said second attribute value.

4. The method of claim 1, further comprising:
generating said result based on a group of validations based on a function that uses a first attribute value of a given attribute in said first audience data layer and a second value of said given attribute in said second audience data layer.

5. The method of claim 1, further comprising:
accessing a first attribute value of a given attribute in said first audience data layer to determine if said first attribute value is NULL;
accessing a second attribute value of said given attribute in said second audience data layer to determine if said second attribute value is NULL; and,
generating said result based on a logic function that uses a first result obtained from said accessing said first attribute value and a second result obtained from said accessing said second attribute value.

6. The method of claim 1, further comprising:
determining said role to send said message to based on a data item of said imported data.

7. The method of claim 1, further comprising:
determining said role to send said message to based on said result.

8. The method of claim 1, further comprising:
determining said role to send said message to based on said imported data and said result.

9. The method of claim 1, further comprising:
determining said role to send said message to based on an audience name.

10. The method of claim 1, further comprising:
saving said result for process analysis.

11. The method of claim 1, further comprising:
laying out said multi-layered data set for a target audience; and,
generating said result after completion of said laying out.

12. The method of claim 1, further comprising:
pivoting a table for a family in said multi-layered data set for a target audience; and,
generating said result after completion of said pivoting.

13. The method of claim 1, further comprising:
publishing said multi-layered data set for a target media type; and,
generating said result after completion of said publishing.

14. The method of claim 1, further comprising:
determining said role to send said message to based on a media type.

15. The method of claim 1, wherein the first and second portions comprise text portions and said first and second visual representations comprise the text portions being displayed in different colors.

16. The method of claim 1, wherein the first and second portions comprise text portions and said first and second visual representations comprise the text portions being displayed with different font attributes.

17. The method of claim 16, wherein the different font attributes include at least: (i) bold type text, (ii) regular type text, and (iii) italic text.

18. The method of claim 1, wherein the first and second portions comprise image portions and said first and second visual representations comprise displayed borders of different colors around the image portions.

* * * * *